United States Patent [19]

Kussmaul

[11] 3,979,248

[45] Sept. 7, 1976

[54] DECAL TRANSFER PRESS

[75] Inventor: Ernest A. Kussmaul, Sayville, N.Y.

[73] Assignee: Images De Luxe, Inc., New York, N.Y.

[22] Filed: Sept. 12, 1975

[21] Appl. No.: 612,983

[52] U.S. Cl. .......... 156/358; 156/359; 156/583; 219/243

[51] Int. Cl.[2] .......... B32B 3/00; G05G 15/00

[58] Field of Search .......... 156/358, 359, 351, 583, 156/492; 219/243, 248, 257, 524

[56] References Cited

UNITED STATES PATENTS

| | | | |
|---|---|---|---|
| 2,766,810 | 10/1956 | Gibson | 219/243 X |
| 3,348,474 | 10/1967 | Virth et al. | 219/243 X |
| 3,454,741 | 7/1969 | Stewart | 219/243 |
| 3,494,816 | 2/1970 | Fener | 156/359 |
| 3,721,801 | 3/1973 | Bate | 219/243 |
| 3,769,139 | 10/1973 | Woods | 156/358 |
| 3,935,054 | 1/1976 | Hirschson | 156/583 X |

*Primary Examiner*—David A. Simmons
*Attorney, Agent, or Firm*—Ladas, Parry, Von Gehr, Goldsmith & Deschamps

[57] ABSTRACT

A decal transfer press for transferring thermally transferable images from paper backings to cloth articles such as T-shirts has an upper platen which is motor driven into pressure engagement with a lower platen when an operator depresses a control lever after initiating a brief start-up interval during which a heater of low thermal mass fastened to the underside of the upper platen attains a preset decal applying temperature. The upper platen is automatically stopped in the down position by deenergizing its drive motor when the pressure the upper platen applies to the lower platen, as manifested by the drive motor armature current, exceeds a preset amount. This starts an electronic timer having a preset timing period, at the expiration of which the timer causes the drive motor to be energized to raise the upper platen out of pressure engagement with the lower platen and to its fully up position, a limit switch there being actuated to deenergize the drive motor and heater and to reset all components to their original pre-start condition.

17 Claims, 11 Drawing Figures

DECAL TRANSFER PRESS

BACKGROUND OF THE INVENTION

This invention relates generally to apparatus for pressing two articles together under heat and pressure, and more particularly to such an apparatus especially suitable for transferring by heat and pressure the image of a decal form its backing to a receiving article, such as a piece of cloth forming the front of a T-shirt.

Decals to which the transfer operation performed by the present invention is applicable may be of the thermoplastic and thermosetting types in which the image undergoes a solid-to liquid-to solid transition in its transfer from the backing (usually parchment-like paper) to the receiving article, or they may be of the sublistatic type in which the transition is solid-to gas-to solid.

In transferring the images of such decals to cloth, it is necessary that the decal be pressed against the cloth with a certain pressure and that the temperature of the decal and cloth be raised to the melting point of the image-defining material to be transferred. Heretofore, this has been done in decal transfer presses utilizing a massive movable upper platen having a heating element embedded therein and manually lowering this platen into pressure engagement with a stationary lower platen on which the decal and underlying cloth are supported. The high thermal mass of the upper platen, of course, gives the upper platen a long warm-up time and for this reason, particularly in retail establishments, such decal transfer presses are kept in readiness for use by being left heated all day. Apart from consuming power wastefully and without let-up, the constantly hot platens create a burn hazard for unwary personnel and increase the heat to uncomfortable levels in the working regions of the decal transfer presses.

Other drawbacks of known decal transfer presses include their reliance on manual lowering and raising of the upper platen and on operator skill in respect of the amount of pressure to be applied and the time duration of its application.

While not designed for carrying out a decal transfer operation other powered presses are known having a stationary platen, a motor-driven movable platen and a heater. Thus, for example, U.S. Pat. Nos. 3,331,726 and 3,454,741 decribes a heater mounted in an upper movable platen for heating a workpiece engaged by this platen during a timed cycle, the latter document additionally describing the use of a manually operated switch to initiate a downward movement of the upper platen as well as an energization of the heater and timer, the timer automatically raising the upper platen at the end of the timed cycle. By way of further example, in U.S. Pat. No. 3,348,474, a limit switch actuates the timer to initiate the heater's timed cycle when the movable platen has advanced toward the stationary platen, and a sensor controls a temperature regulating system for the heater.

SUMMARY OF THE INVENTION

An object of the present ilnvention is to provide an improved decal transfer press which has such a short warm-up time that the press can be kept cold when not in use, yet be fully ready for use in a few seconds when needed.

A further object of the present invention is to provide an improved decal transfer press in which critical decal applying parameters of pressure, temperature and time are automatically controlled in accordance with respective adjustable settings, thereby improving quality control and reducing the possibility of operator error.

Still further objects are to provide an improved decal transfer press in which a minimum of operator effort is required to effect movement of an upper platen into and out of pressure exerting relationship with a lower platen; in which the lower platen is mounted in a manner that ensures uniform pressure distribution when the upper platen is in closed position; in which a power supply, digital logic circuits, an electronic timer, a motor relay, a heater relay, heat and current sensors and various switches are included for automatic control purposes; and in which the force applied by the upper platen to the lower platen is sensed for stopping the downward movement of the upper platen, thereby ensuring that a constant closing force is obtained for all thicknesses of decal receiving articles.

The type of decal transfer press to which the improvements according to the present invention have been directed is one having a base on which a work-supporting lower platen is horizontally mounted to receive pressure exerted thereon by an upper platen pivotally mounted on the base about a horizontal axis so as to swing bodily between open and closed positions.

I have provided a short warm-up time in such a press by fastening heater means of uniform thickness and of low thermal mass relative to the thermal mass of the upper platen to and underlying the upper platen, whereby a decal and an image receiving article lying flat on the lower platen will be pressure engaged directly by the heater means in the closed position of the upper platen.

I have provided automatic control of applied pressure in such a press by utilizing an electronic lower limit switch which is electrically actuated to deenergize a reversible electrical driving motor for the upper platen in response to a load-induced increase of the armature current of the motor beyond a presettable reference value corresponding to the desired applied pressure. Therefore, the closed position of the upper platen will be the lower position at which the desired applied pressure occurs, and it will automatically adjust to accommodate decal receiving articles of respectively different thickness without deviating from the desired applied pressure.

I have provided uniform distribution of the pressure exerted in such a press by the upper platen on the work and lower platen by connecting a central portion of the underside of the lower platen to the base by resilient means which effect the horizontal mounting of the lower platen on the base.

I have minimized the operator effort required in such a press to effect movement of the upper platen into and out of pressure exerting relationship with the lower platen by providing a self-centering control lever on the upper platen. Slight movement of the control lever from its center position actuates either an "open" or "close" switch which controls the direction of rotation of the reversible drive motor for the upper platen and thus the opening or closing of the upper platen. The self-centering action of the control lever ensures that the drive motor will shut off when the operator's hand is removed.

These and other features in accordance with the present invention will be more fully understood from the detailed description read in conjunction with the accompanying drawings.

DETAILED DESCRIPTION OF THE INVENTION AND DRAWINGS

Figure 1:
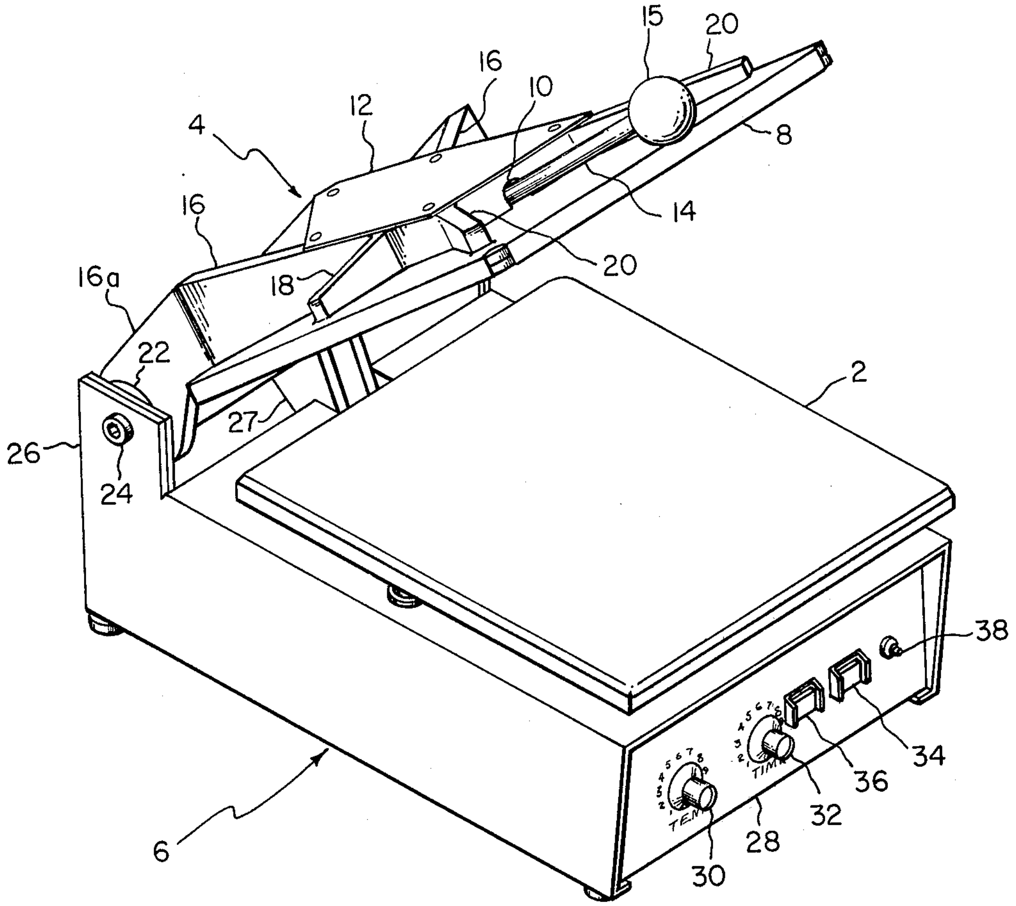
FIG. 1 is an isometric view of a decal transfer press embodying the present invention, showing the upper platen in its open position.

The overall outward appearance of the decal transfer press is evident from the isometric view illustrated in FIG. 1. A lower platen 2 and an upper platen 4 are mounted on a base 6. Attached to the underside of upper platen 4 is a surface heater 8. Extending from a front opening 10 in a central body portion 12 of upper platen 4 is a self-centering control lever 14 which is pivotally mounted within body portion 12 for slight up and down movement by the operator of the press to effect motor-driven up and down movements of upper platen 4. A translucent knob 15 at the exterior end of control lever 14 contains a lamp which lights up to signal the operator when the press is reaady for a ;down movement of upper platen 4.

Three upstanding reinforcing ribs 16, 18 and 20 fan out from each side of central body portion 12 to give structural rigidity to upper platen 4. The rearmost ribs 16 on each side of the press have terminal portions 16a which run parallel to the left and right sides of base 6 and are fixed at their ends to the respective ends of a large diameter cylindrical shaft 22 rotatably supported athwart the rear of base 6 on journals 24 provided in upstanding ears 26 at the respective rear corners of base 6. Rocking rotation of shaft 22 on journals 24 to raise and lower the upper platen 4 is imparted through a pair 27 of parallel crank arms rigidly secured at one end thereof to the underside of shaft 22 and linked at the other end to a drive motor, as will more particularly be described hereinafter.

Base 6 is provided with a front panel 28 having thereon a temperature adjustment knob 30 whose setting with reference to a cooperating calibrated scale determines the temperature that surface heater 8 will reach and maintain for a cycle of operation of the press. A time adjustment knob 32 on front panel 28 determines, in accordance with its setting in regard to a cooperating calibrated scale, the length of the time period the press will be in its closed condition during its cycle of operation. A first switch button 34 on front panel 28 operates an on-off switch (not shown) for the input electrical power to the press, and a second switch button 36 operates an Auto-Start switch (FIG. 11) for starting an operating cycle of the press. Completing the components mounted on front panel 28 is a reset button 38 for a conventional circuit breaker (not shown) protecting the press from electrical overloads.

Figure 2:
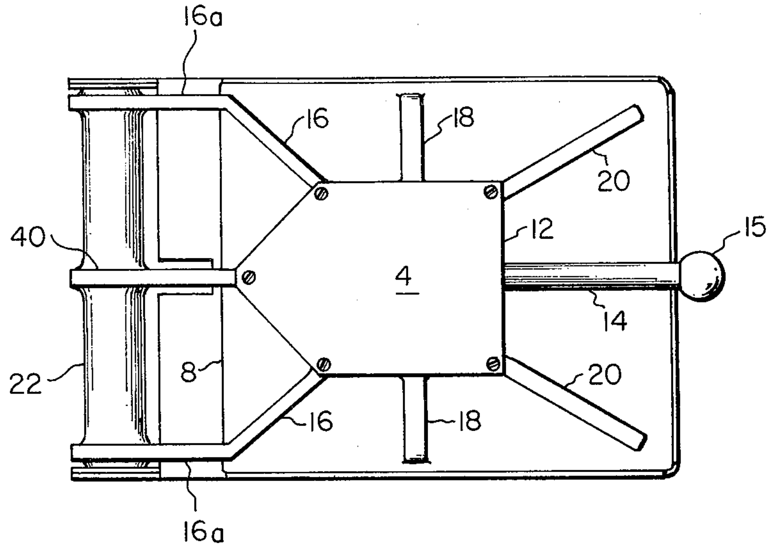
FIG. 2 is a top view of the decal transfer press of FIG. 1, with the upper platen in its closed position.

Referring now to the top view of the closed press in FIG. 2, it is seen that, in addition to being connected to the journaled ends of rock shaft 22 by terminal portions 16a of ribs 16, upper platen 4 is connected to shaft 22 by an upstanding rib 40 running along the longitudinal center line of the press from central body portion 12 with its rear end fixed to the longitudinal center of shaft 22.

Figure 3:
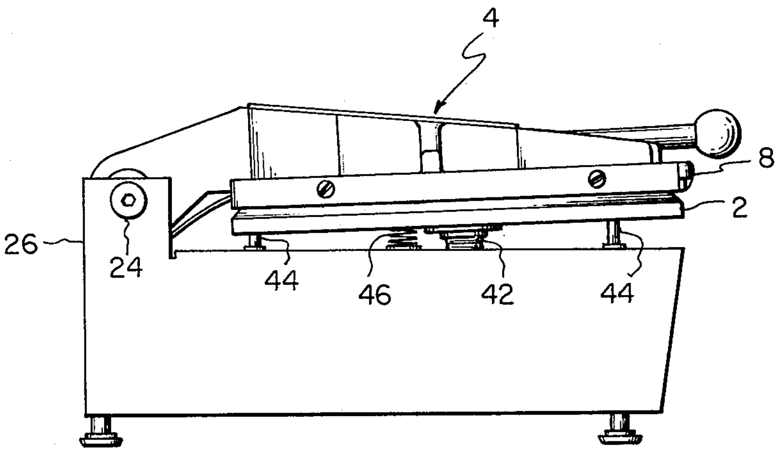
FIG. 3 is a left side view of the decal transfer press of FIG. 1, with the upper platen in its closed position.

In the side view of the closed press shown in FIG. 3, it is seen that lower platen 2 conforms its orientation with that of surface heater 8 of upper platen 4 to provide uniform surface-to-surface contact. This is accomplished by means of a single spring mount 42 connecting the center of the undersurface of lower platen 2 to a suitable bracket 43 (FIG. 6) within base 6. Spring mount 42 is inherently self-centering and assures equal pressure distribution. Guide pins 44 fixed to the undersurface of lower platen 2 near the sides thereof are free to move up and down in suitable receiving holes provided in the top of base 6 and serve to prevent rotation of lower platen 2 about the axis of spring mount 42. Stabilizing springs 46 of weak stiffness relative to that of spring mount 42 interconncet the undersurface of lower platen 2 to the top of base 6 and serve to damp the movements of lower platen 2 on spring mount 42.

Figure 4:
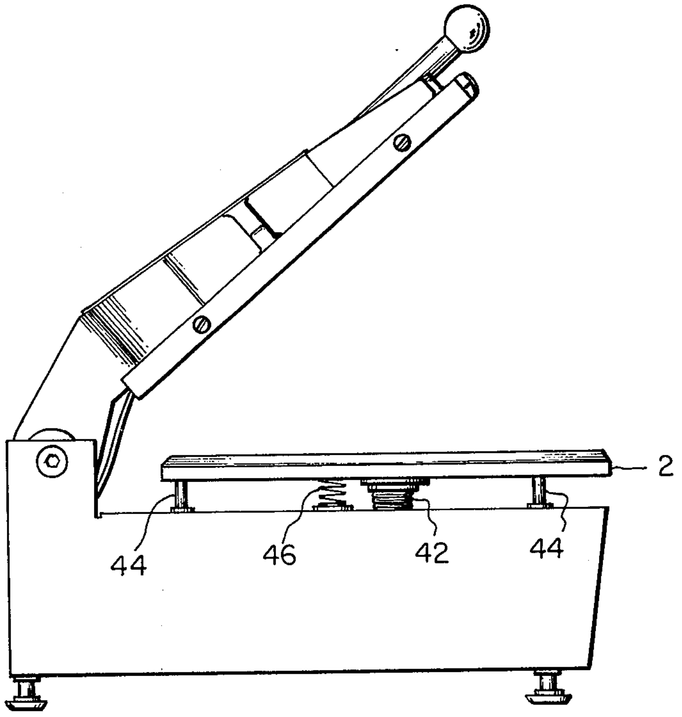
FIG. 4 is a side view of the decal transfer press of FIG. 1, with the upper platen in its open position.

The side view of the open press, depicted in FIG. 4, shows the level orientation normally assumed by lower platen 2 under the influence of sprring mount 42.

Figure 5:
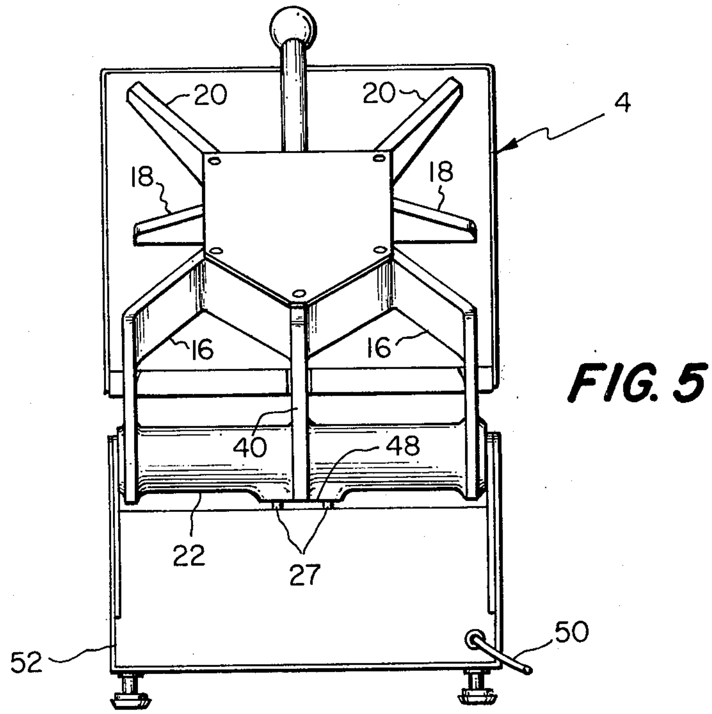
FIG. 5 is a back end view of the decal transfer press of FIG. 1, with the upper platen in its open position.

The respective configurations of ribs 16, 18, 20 and 40 are evident from the back end view of the open press shown in FIG. 5. Parallel crank arms 27 are shown affixed to a flat 48 on the underside of rock shaft 22. Electrical power is supplied to the press by a line cord 50 entering a rear panel 52 of base 6.

Figure 6:
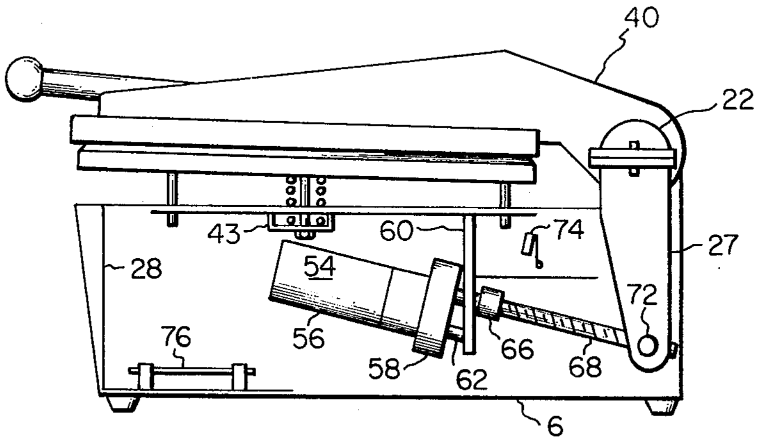
FIG. 6 is a right side view of the decal transfer press of FIG. 1, partially in cross-section.

Within base 6, as seen in FIG. 6, is a gearmotor assembly 54 comprising a fractional horsepower electrically reversible motor 56 and attached reduction gear box 58. A bracket 60 depends from the top of base 6, and gearmotor assembly 54 is face mounted to this bracket at three points by respective universal connections 62, one of which is indicated in FIG. 6. Connections 62 permit the orientation of assembly 54 to change with respect to bracket 60 as crank arms 27 rock between the illustrated vertical position they have when the press is closed and a forwardly tilted position they assume when the press is open.

The output shaft 64 of gearmotor assembly 54 passes freely through a suitable opening in bracket 60 and thence to a coupling 66 which coaxially connects shaft 64 to one end of a leadscrew 68. The other end of leadscrew 68 is engaged with matching threads of a traveling nut 70 (FIG. 7) pivotally held between the lower ends of parallel crank arms 27 by two swivel pins 72. Pins 72 permit the orientation of the lead screw's traveling nut 70 to change with respect to parallel crank arms 27 as the arms rock between their vertical and forwardly tilted positions. Thus, as it moves toward coupling 66, carrying the lower ends of crank arms 27 with it, the traveling nut 20 pivots on swivel pins 72 to accomodate the consequential upward bodily shift of leadscrew 68, this shift being simultaneously accommodated for gearmotor assembly 54 by its mounting connections 62 at bracket 60.

A conventional limit switch 74 is fixed within base 6 and located for actuation in the path of one of crank arms 27 at a point where it is desired to stop further forward tilting of arms 27 about the axis of rock shaft 22 and thus determine the up limit of upper platen 4. The circuitry associated with limit switch 74 will be described hereinafter with reference to FIG. 11. However, FIG. 6 shows a circuit board 76 which includes this circuitry and which is mounted on suitable standoffs within base 6 directly behind front panel 28.

Figure 7:
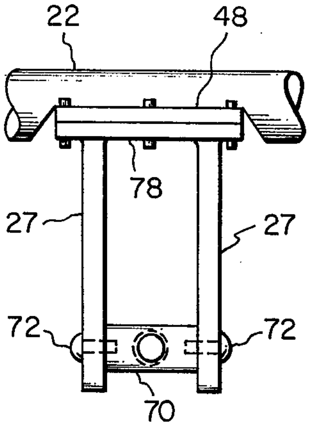
FIG. 7 is a view showing details of the crank arm arrangement between the rock shaft of the upper platen and the output lead screw of the drive motor gear box.

The parallelism of crank arms 27 is maintained by a connecting plate perpendicularly disposed thereto and welded to the upper ends of the arms, the plate being designated by the reference numeral 78 in FIG. 7. As further shown in FIG. 7, plate 78 serves as the means by which arms 27 are affixed to flat 48 on the underside of rock shaft 22,, plate 78 being bolted or otherwise secured in flush relationship to flat 48.

Figure 8:
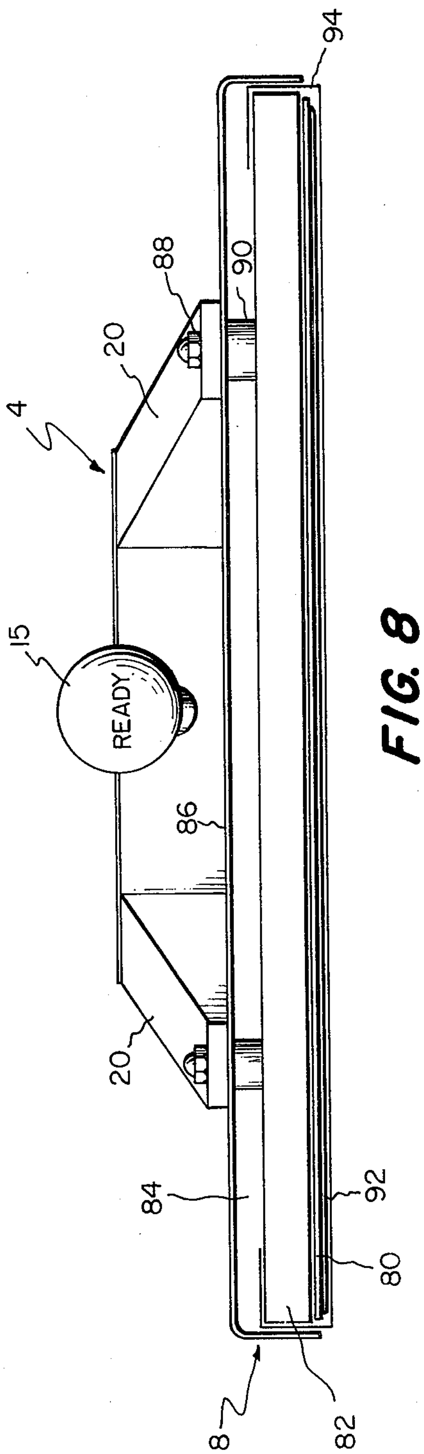
FIG. 8 is a front end view of the upper platen and attached surface heater, the latter being shown in cross-section.
Figure 9:
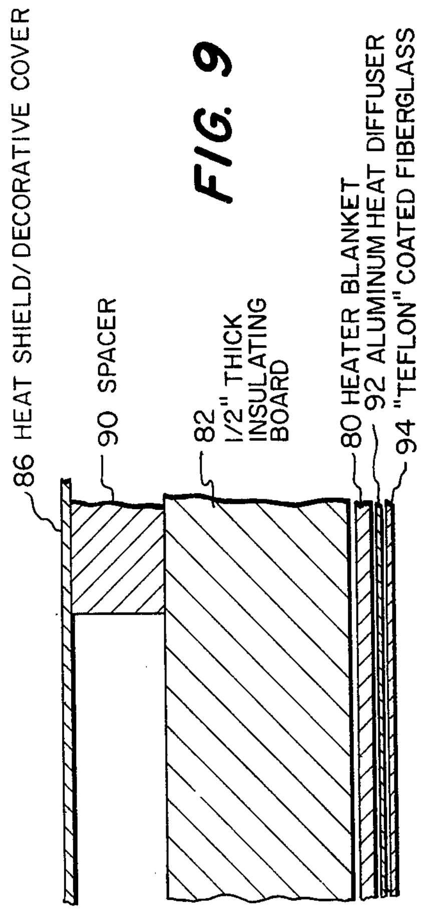
FIG. 9 is an enlarged view of a portion of FIG. 8 showing the heater cross-section in greater detail.

With reference to FIGS. 8 and 9, surface heater 8 is an assembly of components supported by and below upper platen 4. The heat is produced by heating elements in an electrical heater blanket 80 which lies closely against the underside of a relatively thick thermal insulating board 82 preferably of an asbestos-cement composition. Board 82 serves to insulate upper platen 4 from the heat generated by heater blanket 80, and this function is assisted by an air space 84 followed by an aluminum heat shield 86 over insulating board 82, the shield serving also as a decorative cover of surface heater 8.

Connection of surface heater 8 to upper platen 4 is effected, for example, by screws 88 which extend downwardly from the outer ends of ribs 16, 18 and 20 through holes in shield 86, thence through spacer sleeves 90, to terminate in insulating board 82 in anchored relationship therto.

Heater blanket 80 is preferably made of silicone rubber in which a resistance wire grid or a metallic foil grid is embedded to provide the heating elements. A relatively thin aluminum sheet 92 directly underlies heater blanket 80 in surface-to-surface contact therewith and serves as a heat diffuser. A cloth cover 94, preferably woven of glass fibers coated with polytetrafluoroethylene, is tightly fitted over the entire lower surface of diffuser sheet 92, from whence it runs upwardly within the side walls of heat shield 86 and alongside the stack formed by sheet 92, heater blanket 89 and insulating board 82, and then terminates atop board 82 a short distance in from the sides thereof.

The sensing of the temperature of surface heater 8 in connection with the heater being controlled to reach and maintain the temperature set by temperature adjustment knob 30 is effected by a thermistor 96 (schematically depicted in FIG. 11) located at a suitable sensing position within surface heater 8.

Lower platen 2 may simply consist of a ¼″ steel plate whose lower horizontal surface is centrally connected to the single spring mount 42 and whose upper horizontal surface supports a ½″ silicone rubber sponge pad, there being a cloth cover similar to cloth cover 94 of surface heater 8 tightly fitted over the entire upper surface of the sponge pad and extending partially under the steel plate where it is held taut by spring-loaded clips.

Figure 10:
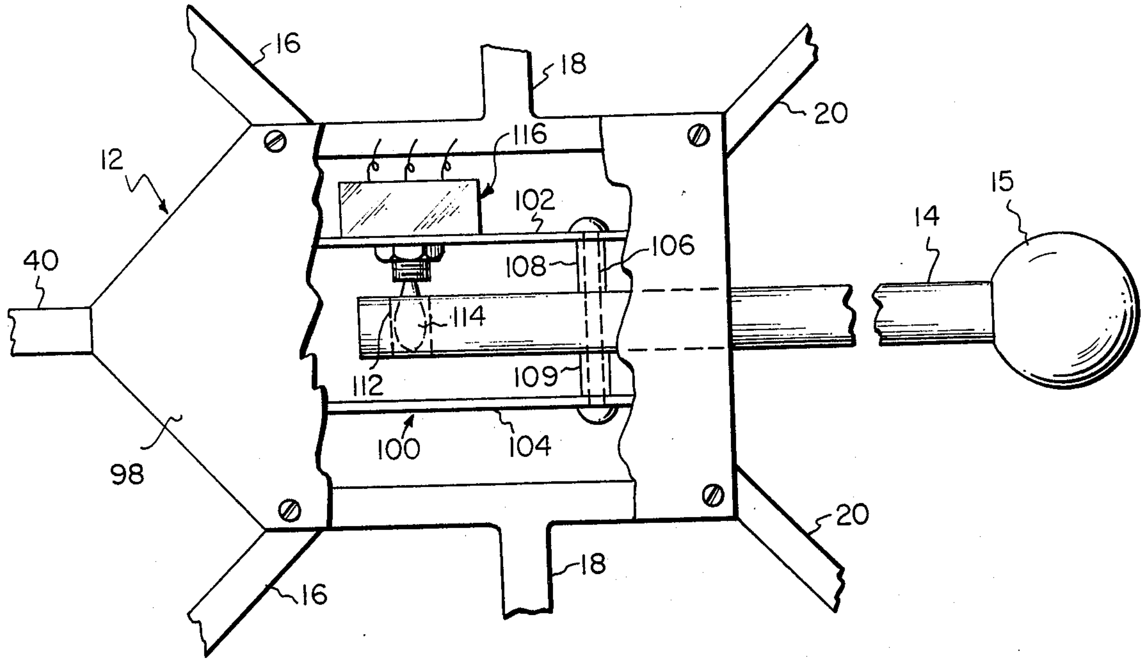
FIG. 10 is a view showing the control lever and associated components thereof within the central portion of the upper platen of the decal transfer press of FIG. 1.

As stated earlier in connection with FIG. 1, a self-centering, pivotally-mounted control lever 14 extends from central body portion 12 of upper platen 4, the actuation of which lever brings about the up and down movements of upper platen 4. With reference now to FIG. 10, it is seen that central body portion is hollow and is closed at the top by a removable cover 98, only the end portions of which are shown so as to reveal the underlying contents of central body portion 12. These contents include a longitudinally extending U-shaped member 100 which runs the length of body portion 12 with its side walls 102, 104 perpendicularly disposed to the upper surface of heat shield 86, which surface closes the bottom of body portion 12.

A pivot pin 106, passing freely through a lateral hole in control lever 14, extends across the channel of U-shaped member 100 from wall 102 to wall 104, thereby providing a fulcrum for the up and down pivotal movements of control lever 14. Spacer sleeves 108, 109 on pivot pin 106 serve to hold lever 14 equidistant from channel walls 102, 104.

Between its fulcrum end where it terminates within body portion 12 and the fulcrum itself, control lever 14 is provided with a lateral hole 112 whose axis is perpendicular to channel walls 102, 104. Hole 112 snugly receives a projecting toggle member 114 of a three-way switch 116 mounted on wall 102. Switch 116 is of a well-known type which is in a normal OFF state when its toggle member is centered, but closes a first pair of contacts when its toggle member is moved away from center in one direction against an internally generated restoring spring force and closes a second pair of contacts when its toggle member is moved in the opposite direction away from center against the restoring spring force.

By this arrangement, the spring force which keeps toggle member 114 normally centered and consequently maintains switch 116 normally in its OFF state, simltaneously keeps control lever 14 normally in a neutral position. However, when an operator moves knob 15 of control lever 14 upwardly (with reference to the plane of the paper of FIG. 10), the switch-actuating end of lever 14 moves downwardly to close the contact pair depicted in FIG. 11 as the UP contacts. Immediately upon removal of the operator's hand from knob 15, switch 116 spring-restores itself to its OFF state and simultaneously moves control lever 14 to its neutral position. The contact pair depicted in FIG. 11 as the DOWN contacts are closed by a movement of knob 15 downwardly that causes upward movement of the switch-actuating end of lever 14; and, again, release of knob 15 by the operator results in an immediate restoration of lever 14 to its neutral position.

It will be appreciated that the distance from knob 15 to pivot pin relative to that from the toggle-receiving hole 112 is sufficiently longer that only slight up and down movements of knob 15 are required to actuate the UP and DOWN contact pairs of switch 116. One contact of each of these contact pairs is common to both pairs, as indicated by the three pigtail leads leaving switch 116 in FIG. 10 and the three terminals of switch 116 as shown in FIG. 11.

Figure 11:
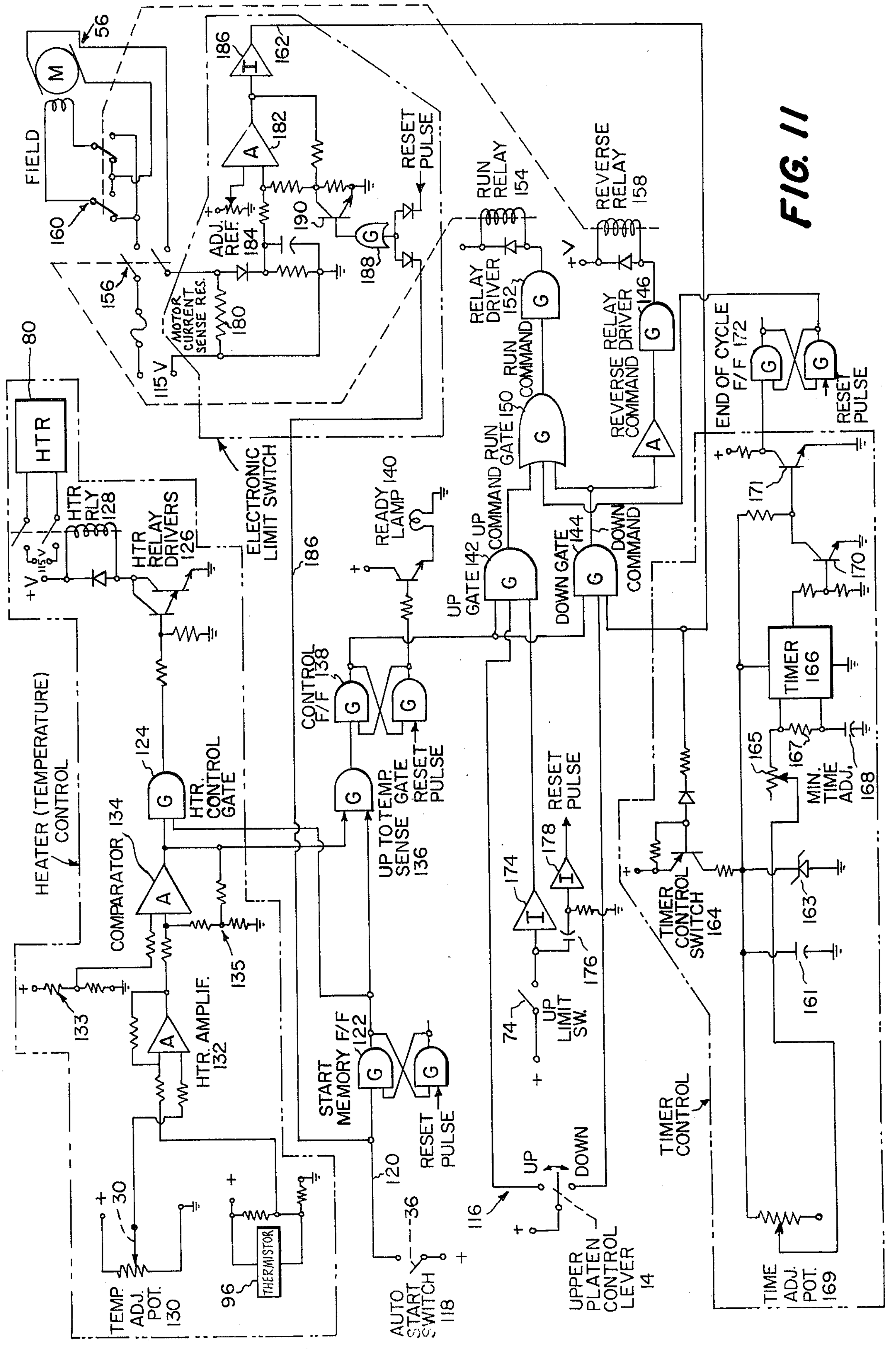
FIG. 11 is a schematic diagram of the electronic control circuitry of the decal transferpress of FIG. 1.

Referring now to the schematic diagram in FIG. 11 of the electronic control circuitry of the decal transfer press, it is to be understood that all terminals having a + sign adjacent thereto are connected in common to the regulated output of a conventional regulated power supply having a +V sign adjacent thereto are connected in common to an unregulated output of the same power supply in order to avoid unnecessarily loading the regulated output to energize components that function just as well with the unregulated output.

For ease of explanation, the control circuitry can be subdivided into four portions, three of which are enclosed in chain lines and identified respectively in FIG. 11 as the HEATER(TEMPERATURE)CONTROL, the TIMER CONTROL and the ELECTRONIC LIMIT SWITCH, the fourth portion being what remains in FIG. 11 and consisting principally of digital logic circuits.

Upon pushing switch button 36 on front panel 28, the operator thereby closes an Auto-Start switch 118 to supply a regulated setting signal on lead 120 to a Start Memory F/F 122. In its set state, flip-flop 122 enables a Heater Control Gate 124 which drives Heater Relay Drivers 126 comprising a Darlington transistor pair which in turn energize a heater Relay 128 to supply line voltage, e.g. 115 volts, to heater blanket 80.

When heater blanket 80 attains the desired temperature, thermistor 96 senses this and a temperature signal derived therefrom and from a Temperature Adjustment Potentiometer 130 set by temperature adjustment knob 30 on front panel 28 is fed by way of a Heater Amplifier 132 to a Comparator amplifier 134 having a bias level set by a voltage divider 133. When this bias level is overcome by the signal from Heater Amplifier 132, the Comparator amplifier 134 applies a signal to Heater Control Gate 124 to disable it. This deenergizes Heater Relay 128. In addition, Comparator amplifier 134 is provided with a positive feedback circuit 135 so that it will toggle and thus prevent chatter of Heater Relay 128 when the desired temperature is attained. The output signal of Comparator amplifier 134 is also fed to an Up To Temperature Sense Gate 136 and enables it to thereby set a Control F/F 138. In its set state, flip-flop 138 energizes a Ready Lamp 140 located within translucent knob 15 on control lever 14. In addition, flip-flop 138 supplies a first required enabling signal to an Up Gate 142 and a Down Gate 144.

The operator, upon being signaled by the illumination of Ready Lamp 140, closes the press by moving the knob end of control lever 14 downwardly. Lever 14 thereby closes the Down contacts of three-way switch 116 to supply a second enabling signal to Down Gate 144 which causes it to drive a Relay Driver 146 through an amplifier 148. Down Gate 144 also supplies an enabling signal to a Run Gate 150 which causes it to drive a Relay Driver 152. Relay Driver 152 energizes a Run Relay 154 to close double-pole single-throw contacts 156 thereof, and Relay Driver 146 energizes a Reverse Relay 158 to shift the throw of double-pole double-throw contacts 160 thereof, whereby line voltage is connected to the armature and field windings of drive motor 56 in a sense to close upper platen 4.

Upper platen 4 continues to close until the ELECTRONIC LIMIT SWITCH provides a signal on its output line 162 to disable Down Gate 144 and stop drive motor 56. In addition, the signal on line 162 closes a Timer Control Switch 164, shown as a switching transistor, which applies the regulated supply voltage to a Timer 166, for starting the timing cycle thereof, and to an external resistance-capacitance network of adjustable time constant coupled to Timer 166, for determining the period of the timing cycle. The principle components of the resistance-capacitance network are a Timer Adjustment Potentiometer 169, which is set by time adjustment knob 32 on front panel 28, and a fixed capacitor 168. The remaining components are a variable calibrating resistor 165 and a fixed resistor 167 in series with potentiometer 169. Timer 166 is commercially available from Signetics Corporation, Sunnyvale, California as a Type 555 integrated circuit timer. The integrated circuit detects the voltage across capacitor 168 and when this voltage reaches a preset threshold of 2/3 of the supply voltage, Timer 166 provides an output pulse signifying the end of the timing cycle. The 2/3 ratio of capacitor voltage to supply voltage is inherent to the integrated circuit and is provided to avoid timing errors arising from variations in supply voltage. In this respect, with variations in supply voltage, both the capacitor voltage as well as the 2/3 reference voltage will change in proportionate amounts. The period of the timing cycle, therefore, is a function only of the time required to charge capacitor 168 through its associated resistance components. Supply voltage variations are minimized at the input of Timer 166, however, by further regulation with a Zener diode 163 having a noise filtering capacitor 161 connected thereacross.

When Timer 166 completes its timing cycle, it applies its output pulse to a transistor 170 and in turn to a transistor 171 to set an End of Cycle F/F 172. In its set state, flip-flop 172 enables Run Gate 150 which drives Relay Driver 152 and Run Relay 154 to operate motor 56 to open the press. At this time, Reverse Relay 158 remains in the unenergized condition to which it was put when Down Gate 144 was disabled by the signal on the electronic limit switch output line 162, whereby field winding contacts 160 are in their normal press opening state.

When the press is fully opened, Up Limit Switch 74 is closed, applying a signal through an inverter 174 to disable Up Gate 142 to stop motor 56. The signal is also supplied through a capacitor 176 to an inverter 178 which generates a Reset Pulse which resets all the flip-flops and the ELECTRONIC LIMIT SWITCH.

The ELECTRONIC LIMIT SWITCH is provided instead of a simple down limit switch similar to the up limit switch 74 in order that the down limit of upper platen 4 is determined by the force applied to lower platen 2. In this way, a constant force will be applied for all thicknesses of decal receiving articles, such as T-shirts, sweat shirts, robes, jackets and other articles of diverse thickness.

One technique of detecting closing force utilizes a sensing of motor current. This technique is preferred in the press according to the invention, and a means for carrying it out is illustrated in FIG. 11 as the ELECTRONIC LIMIT SWITCH. Any other means of execution, however, would be suitable, such as one using a piezoelectric sensor to produce a force signal or one using a torsion shaft whose twist actuates a switch to produce a force signal.

In operation, the motor current passing through motor 56 increases as upper platen 4 closes and compresses spring mount 42 of lower platen 2; and is sensed by measuring the voltage drop across a Motor Current Sense Resistor 180 which may be no more than a 1 ohm resistor. This voltage is rectified and filtered and compared in a motor current sense amplifier 182 to a reference voltage set at an Adjustable Reference poteniometer 184. When the rectified current sense voltage exceeds this reference voltage, the output of sense amplifier 182 goes to a "logic 1" (high) and through positive feedback latches in that state. This "logic 1" signal, after passing through an inverter 186, becomes the down limit signal that is fed on lead 162 to Down Gate 144 and Timer Control Switch 164, as previously described. The current sense amplifier 182 latch is reset by the Reset Pulse produced by Inverter 178 as well as by the signal produced on lead 120 by Auto Start Switch 118, the latter signal being fed by way of a lead 186, a gate 188 and a transistor 190 in unlatching relation to the positive feedback connection of current sense amplifier 182.

The invention is not limited by the exemplary decal transfer press described herein and illustrated in the accompanying drawings. Modifications will be obvious to those skilled in the art and are applicable without departing from the essential features of the invention and within the scope of the claims annexed hereto.

I Claim:

1. A decal transfer press in which a surface heater mounted on an upper platen is brought into surface-to-surface contact with a lower platen by moving the upper platen downwardly about the horizontal axis of a rock shaft to which the rear end of the upper platen is rigidly connected, wherein:

a. the lower platen is resiliently mounted at a central point thereof to the top of a box-like base,
b. the rock shaft is journaled above the lower platen at the top of said base,
c. a reversible motor within said base is coupled in driving relation to said rock shaft for moving said upper platen about said rock shaft axis,
d. means are provided for selectively energizing said motor to move said upper platen toward and away from said lower platen, and
e. means are provided, responsive to the force applied to said lower platen by said upper platen when said surface heater is brought into said surface-to-surface contact with said lower platen, for deenergizing said motor.

2. A decal transfer press according to claim 1, wherein the force responsive means comprises a resistor connected to said energizing means in a manner to conduct current supplied to said motor, whereby the voltage drop across said resistor is a measure of said applied force.

3. A decal transfer press according to claim 1, wherein the resilient mounting of the lower platen to the top of said base is a single, vertically disposed spring mount which normally holds said lower platen in horizontally spaced parallel relation to and above said top, there being means cooperating between said lower platen and said top for preventing rotation of said lower platen about the axis of said spring mount.

4. A decal transfer press according to claim 1, wherein the coupling of said reversible motor in driving relation to said rock shaft is effected by a linkage comprising a parallel arm rigidly affixed at one end to the underside of said rock shaft and having a threaded nut mounted to swivel between the parallel arms at the other end of said crank, a lead screw threadly engaged with said nut and a reduction gear box connected in driven relation to said motor and in driving relation to said lead screw, said motor being pivotally mounted within said base to accommodate up and down bodily movements of said lead screw caused by travel thereon of said nut as said nut carries said other end of said crank toward and away from said motor to raise and lower said upper platen.

5. A decal transfer press according to claim 1, wherein said surface heater is of low thermal mass relative to the thermal mass of said upper platen.

6. A decal transfer press according to claim 5, wherein said surface heater comprises a rubber blanket having electrical heating elements embedded therein, a relatively thick insulating board directly overlying said blanket, a metallic heat diffuser directly underlying said blanket, a metallic heat shield overlying said insulating board in spaced parallel relation thereto and a cloth cover covering said heat diffuser to provide the lower platen contacting surface of said surface heater, said surface heater being mounted on said upper platen by securing means anchored in said insulating board.

7. A decal transfer press according to claim 5, wherein said surface heater includes a temperature sensing element having an electrical parameter that changes in a predetermined manner with changes in temperature.

8. A decal transfer press according to claim 7, wherein said temperature sensing element is connected in controlling relation to a relay adapted selectively to energize and deenergize electrical heating elements of said surface heater.

9. A decal transfer press according to claim 8, wherein means are provided for comparing the changing electrical parameter of said temperature sensing element with an adjustable reference electrical parameter and producing a relay input signal in accordance with the comparison result.

10. A decal transfer press according to claim 9, wherein the temperature sensing element is a thermistor, said adjustable reference electrical parameter being the resistance of an adjustable resistor.

11. A decal transfer press according to claim 1, wherein said upper platen has a central body portion within which a longitudinally extending control lever is pivotally connected for up and down movement at a point closer to one lever end which is in said body portion than to the opposite lever end which extends out of a front face of said body portion, said body portion further including a three-way switch linked to said one lever end so as to be operated one way when said opposite end of the lever is moved up from a neutral position, a second way when said opposite end of the lever is moved down from said neutral position and a third way when said opposite end of the lever is in said neutral position, and resilient means connected to said lever for continuously urging said opposite end thereof to said neutral position.

12. A decal transfer press according to claim 11, wherein said three-way switch includes said resilient urging means.

13. A decal transfer press according to claim 11, wherein said three-way switch is arranged to provide an electrical up command signal when operated said one way, an electrical down command signal when operated said second way and no signal when operated said third way.

14. A decal transfer press according to claim 13, wherein said means for selectively energizing said motor is interconnected between said three-way swtich and said motor and is responsive to said up command signal to energize said motor in a sense to move said upper platen upwardly and responsive to said down command signal to energize said motor in a sense to move said upper platen downwardly.

15. A decal transfer press according to claim 1, wherein timing means are provided for determining the length of time said surface heater remains in contact with said lower platen, said timing means being actuated to start its timing cycle by said force responsive means and to stop its timing cycle in accordance with the setting of an adjustable potentiometer coupled to an input of said timer.

16. A decal transfer press according to claim 8, wherein said relay for energizing and deenergizing said electrical heating elements is placed in its element energizing condition by the output of a flip-flop in response to setting signal input to the flip-flop produced by actuation of a switch located on a front panel of said base.

17. A decal transfer press according to claim 16, wherein a ready lamp is provided which illuminates in response to the output of said flip-flop and the reaching of a predetermined temperature by said surface heater.

* * * * *